(12) United States Patent
Dry et al.

(10) Patent No.: US 10,336,284 B2
(45) Date of Patent: Jul. 2, 2019

(54) AIRBAG TETHER RELEASE

(71) Applicant: Ford Global Technologies, LLC, Dearborn, MI (US)

(72) Inventors: Alan George Dry, Grosse Point Woods, MI (US); Johnathan Andrew Line, Northville, MI (US); Brian Robert Spahn, Plymouth, MI (US); Marcos Silva Kondrad, Macomb Township, MI (US); Kevin Wayne Preuss, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 148 days.

(21) Appl. No.: 15/664,552

(22) Filed: Jul. 31, 2017

(65) Prior Publication Data
US 2019/0031133 A1    Jan. 31, 2019

(51) Int. Cl.
| B60R 21/2338 | (2011.01) |
| B60R 21/207 | (2006.01) |
| B60R 21/231 | (2011.01) |
| B60R 21/00 | (2006.01) |
| B60R 21/235 | (2006.01) |

(Continued)

(52) U.S. Cl.
CPC ........ *B60R 21/2338* (2013.01); *B60R 21/207* (2013.01); *B60R 21/23138* (2013.01); *B60R 21/0136* (2013.01); *B60R 21/264* (2013.01); *B60R 2021/0048* (2013.01); *B60R 2021/0051* (2013.01); *B60R 2021/0053* (2013.01); *B60R 2021/0058* (2013.01); *B60R 2021/01027* (2013.01); *B60R 2021/01054* (2013.01); *B60R 2021/01286* (2013.01); *B60R 2021/23146* (2013.01); *B60R 2021/23386* (2013.01);
(Continued)

(58) Field of Classification Search
CPC .............. B60R 21/2338; B60R 21/207; B60R 21/23138; B60R 21/276; B60R 2021/23388; B60R 2021/23384; B60R 2021/23146; B60R 2021/23386; B60R 2021/23382; B60R 2021/2765
USPC ...................................... 280/743.2
See application file for complete search history.

(56) References Cited

U.S. PATENT DOCUMENTS

| 7,374,205 B2 | 5/2008 | Thomas |
| 7,419,184 B2 | 9/2008 | Green et al. |

(Continued)

FOREIGN PATENT DOCUMENTS

| CN | 105397709 A | 3/2016 | |
| DE | 29716573 U1 * | 3/1998 | ........... B60R 21/232 |
| WO | 2008038523 A1 | 4/2008 | |

*Primary Examiner* — Keith J Frisby
(74) *Attorney, Agent, or Firm* — Frank A. MacKenzie; Bejin Bieneman PLC (57) ABSTRACT

An airbag system includes an airbag. The airbag system includes a base defining a track extending from a first end to a second end. The airbag system includes a carrier releasably fixed to the base and removable from the base at the second end. The airbag system includes a tether extending from the carrier and secured to the airbag. The airbag system includes a spring disposed at the first end. The spring is disposed between the carrier and the base. Upon application of a force to the carrier, e.g., via the tether when the airbag is inflated, the carrier is released from the base and compresses the spring. Upon removal of the force, the spring urges the carrier toward the second end where the carrier is ejected.

20 Claims, 7 Drawing Sheets (51) Int. Cl.
  *B60R 21/264* (2006.01)
  *B60R 21/01* (2006.01)
  *B60R 21/0136* (2006.01)

(52) U.S. Cl.
  CPC ............... *B60R 2021/23388* (2013.01); *B60R 2021/23514* (2013.01); *B60R 2021/23542* (2013.01)

(56) References Cited

U.S. PATENT DOCUMENTS

| | | | |
|---|---|---|---|
| 7,832,763 B2 | 11/2010 | Stevens | |
| 8,408,585 B2 | 4/2013 | Paxton et al. | |
| 8,678,432 B1 | 3/2014 | Quioc et al. | |
| 2002/0084633 A1* | 7/2002 | Heigl | B60R 21/232 280/730.2 |
| 2002/0135166 A1* | 9/2002 | Thomas | B60R 21/216 280/735 |
| 2003/0020266 A1* | 1/2003 | Vendely | B60R 21/217 280/739 |
| 2004/0070183 A1* | 4/2004 | Nakamura | B60R 21/213 280/730.2 |
| 2004/0119273 A1* | 6/2004 | Husby | B60R 21/231 280/743.2 |
| 2007/0267855 A1* | 11/2007 | Lewis | B60R 21/2338 280/739 |
| 2009/0001698 A1* | 1/2009 | Kim | B60R 21/2338 280/737 |
| 2009/0302588 A1* | 12/2009 | Schramm | B60R 21/233 280/743.2 |
| 2011/0285115 A1* | 11/2011 | Putala | B60R 21/213 280/730.2 |
| 2011/0309605 A1* | 12/2011 | Kumagai | B60R 21/2338 280/741 |

\* cited by examiner

AIRBAG TETHER RELEASE

BACKGROUND

A vehicle may include a variety of airbags deployable during an impact to absorb energy from occupants of the vehicle during the impact. The airbag may be a component of an airbag assembly including a housing supporting the airbag, and an inflation device in communication with the airbag for inflating the airbag from an uninflated position to an inflated position. The airbag assemblies may be supported on a steering wheel of the vehicle, an instrument panel of the vehicle, etc. Deployment and inflation of an airbag may be controlled with the use of a tether fixed to the airbag.

DETAILED DESCRIPTION

An airbag system includes an airbag. The airbag system includes a base defining a track extending from a first end to a second end. The airbag system includes a carrier releasably fixed to the base and removable from the base at the second end. The airbag system includes a tether extending from the carrier and secured to the airbag. The airbag system includes a spring disposed at the first end and between the carrier and the base.

The airbag system may include a seat supporting the airbag and the base.

The airbag system may include a pin releasably fixing the carrier to the base. The pin is designed to break when the tether is pulled when the airbag is inflated.

The spring may urge the carrier in a direction opposite a deployment direction of the airbag.

An airbag tether anchoring device includes a base defining a track extending from a first end to a second end. The airbag tether anchoring device includes a carrier releasably fixed to the base and removable from the base at the second end. The airbag tether anchoring device includes a tether extending from the carrier. The airbag tether anchoring device includes a spring disposed at the first end and between the carrier and the base.

The tether may extend from the first end.

The airbag tether anchoring device may include a ramp supported by the base and disposed at the second end.

The base may include a hole. The ramp may be disposed between the hole and the carrier.

The carrier may be disposed between the ramp and the spring.

The carrier may include an extension portion disposed within the spring.

The carrier may include an extension portion. The base may include an extension receiving portion that defines a passage designed to permit the extension portion to be slidably received therein.

The base may include a distal end. The base may include a channel extending from the distal end to the first end along the passage. The channel may be open to the passage.

A width of the passage may be greater than a width of the channel.

The extension portion may be disposed within the extension receiving portion.

The airbag tether anchoring device may include a pin releasably fixing the carrier to the base.

The pin may be designed to break when the tether is pulled by an inflating airbag.

The base may include a distal end. The base may include a channel extending from the distal end to the first end. The tether may be disposed within the channel and extend through the distal end.

The carrier may be configured to be slidable along the track to a compressed position when the carrier is released from being fixed to the base. The spring may be compressed between the base and the carrier in the compressed position.

The carrier may include a distal end that abuts the base in the compressed position.

The carrier may include an extension portion. The base may include an extension receiving portion that defines a passage. The extension portion may be disposed in the passage in the compressed position.

With reference to the Figures, an airbag system 20 includes an airbag 22 and a base 24. The base 24 define a track 26 extending from a first end 28 to a second end 30. The airbag system 20 includes a carrier 32 releasably fixed to the base 24 and removable from the base 24 at the second end 30. The airbag system 20 includes a tether 34 extending from the carrier 32 and secured to the airbag 22. The airbag system 20 includes a spring 36 disposed at the first end 28 and between the carrier 32 and the base 24. Specifically, the airbag system 20 includes an airbag tether anchoring device. The base 24, the carrier 32, the tether 34, and the spring 36 are components of an airbag tether anchoring device 37. The airbag system 20 may include any suitable number of airbag tether anchoring devices 37. For example, the airbag system 20 shown in the figures includes two airbag tether anchoring devices 37. Each tether anchoring device 37 may be identical, and common numerals are used to identify common features.

Upon inflation, the airbag 22 applies a force to the tether 34. The tether 34 applies such force to the carrier 32. Application of the force on the carrier 32 releases the carrier 32 from being releasably fixed to the base 24. The carrier 32 slides along the track 26 towards the first end 28 and compresses the spring 36. When the force is removed, e.g., when the airbag 22 deflates, the spring 36 urges the carrier 32 toward the second end 30, where the carrier 32 is ejected from the base 24.

The airbag system 20 may include a seat 38. The seat 38 supports the airbag 22 and the base 24.

Figure 1:
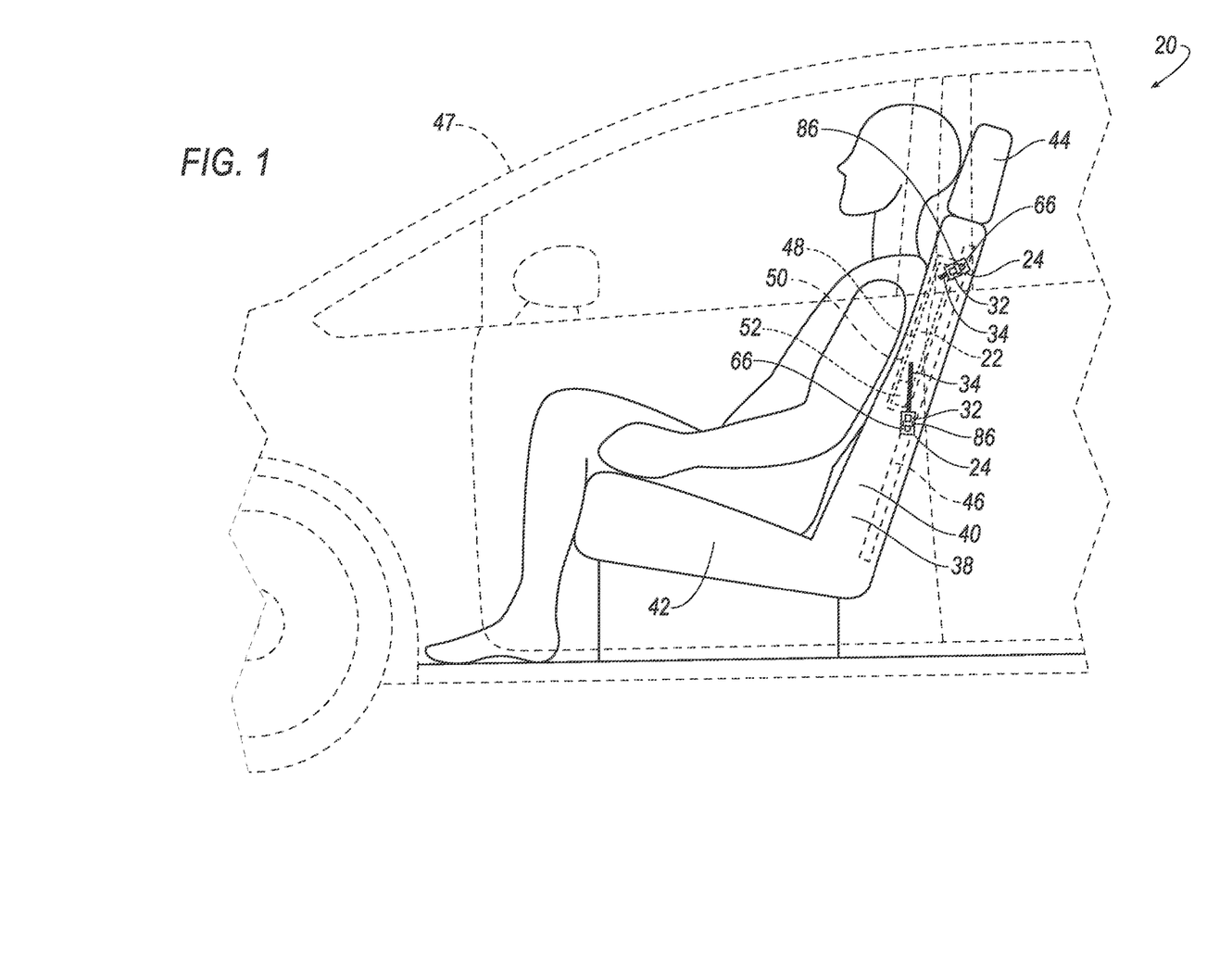
FIG. 1 is a side view of an example airbag system in an uninflated position and supported by an example vehicle.
Figure 2:
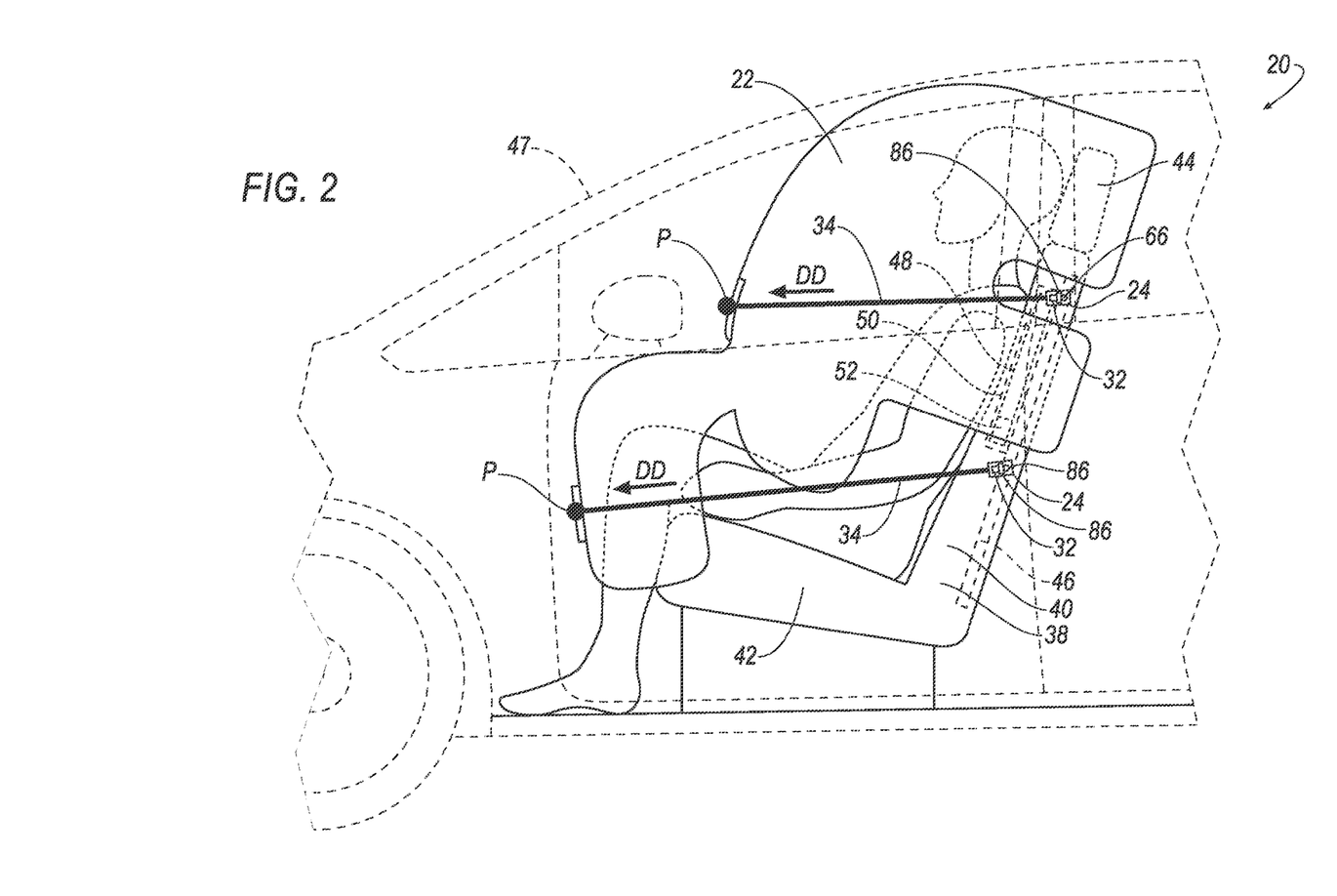
FIG. 2 is a side view of the example airbag system in an inflated position and supported by the example vehicle.
Figure 3:
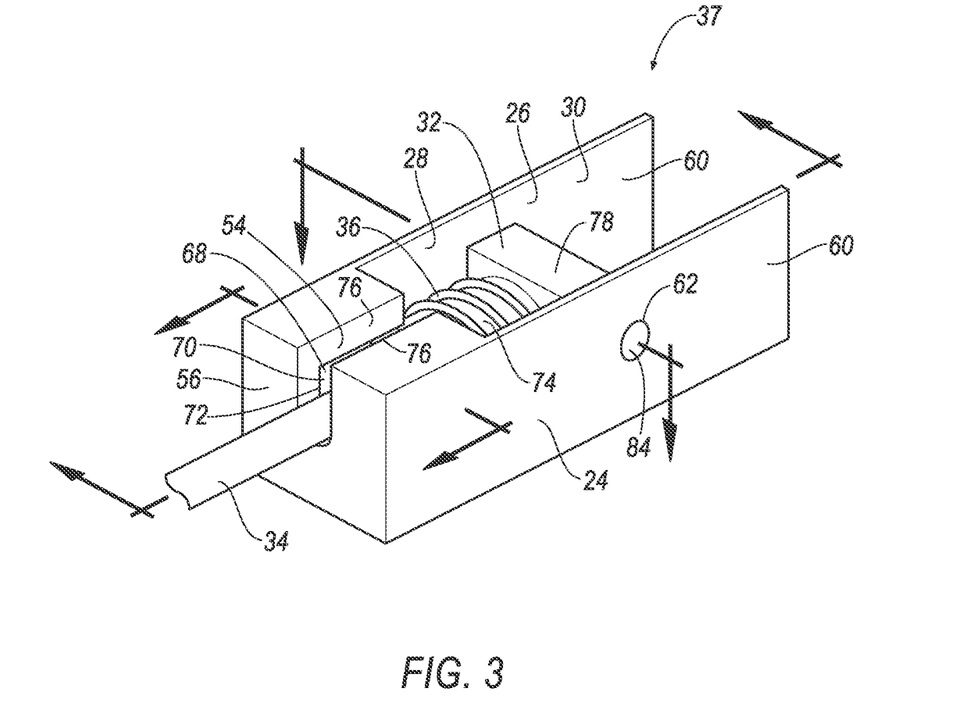
FIG. 3 is a perspective view of an example airbag tether anchoring device.
Figure 4:
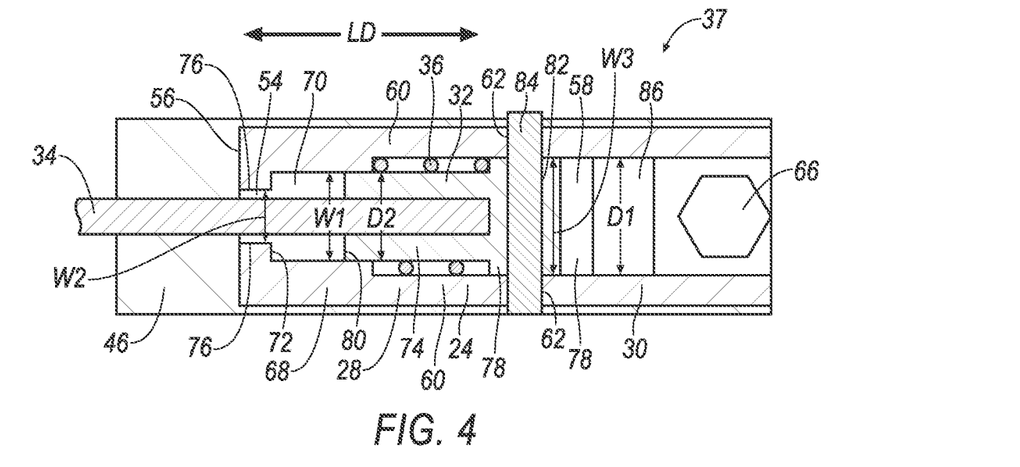
FIG. 4 is a top cross section of the example airbag tether anchoring device with a carrier releasably fixed to a base.
Figure 5:
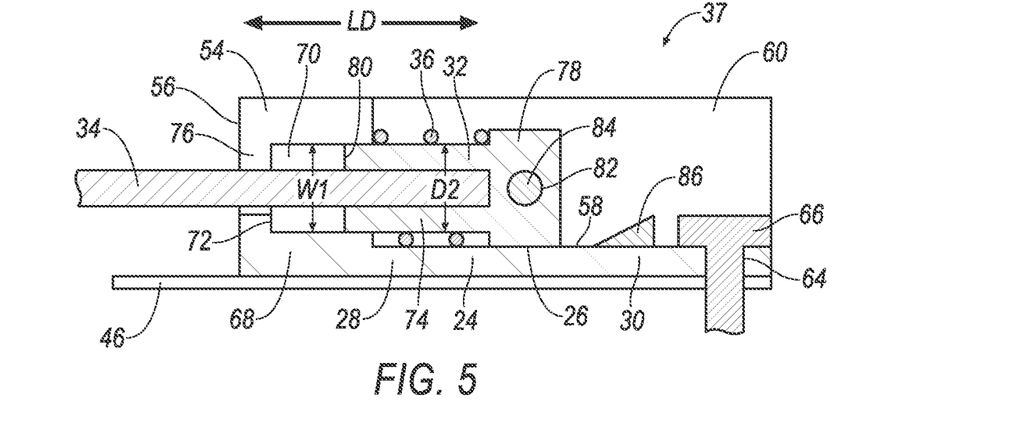
FIG. 5 is a side cross section of the example airbag tether anchoring device of FIG. 4.
Figure 6:
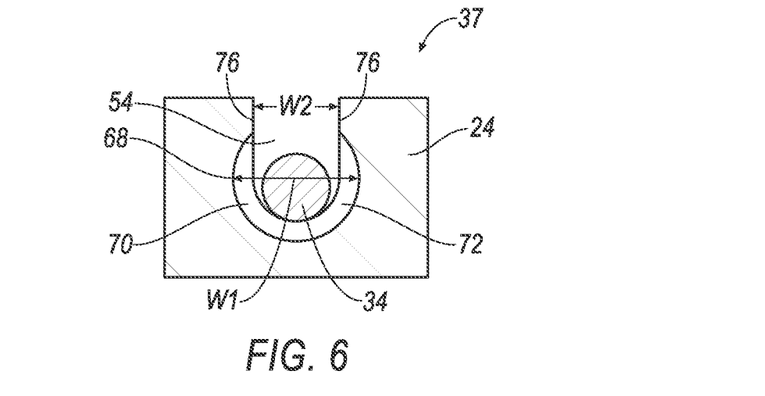
FIG. 6 is a front cross section of the example airbag tether anchoring device.

The seat 38 shown in FIGS. 1 and 2 is a bucket seat 38, but alternatively the seat 38 may be a bench seat or another type of seat.

The seat 38 may include a seat back 40, a seat bottom 42, and a headrest 44. The headrest 44 may be supported by the seat back 40 and may be stationary or movable relative to the seat back 40. The seat back 40 may be supported by the seat bottom 42 and may be stationary or movable relative to the seat bottom 42. The seat back 40, the seat bottom 42, and/or the headrest 44 may be adjustable in multiple degrees of freedom. Specifically, the seat back 40, the seat bottom 42, and/or the headrest 44 may themselves be adjustable, in other words, adjustable components within the seat back 40, the seat bottom 42, and/or the headrest 44, and/or may be adjustable relative to each other.

The seat bottom 42 and/or the seat back 40 may include a frame 46 and a covering supported on the frame 46. The frame 46 may include tubes, beams, etc. The frame 46 may be formed of any suitable plastic material, e.g., carbon fiber reinforced plastic (CFRP), glass fiber-reinforced semi-finished thermoplastic composite (organosheet), etc. As another example, some or all components of the frame 46 may be formed of a suitable metal, e.g., steel, aluminum, etc.

The covering may include upholstery and padding. The upholstery may be formed of cloth, leather, faux leather, or any other suitable material. The upholstery may be stitched in panels around the frame 46. The padding may be between the covering and the frame 46, and may be foam or any other suitable material.

The seat 38 may be included in a vehicle 47. The vehicle 47 may be any passenger or commercial automobile such as a car, a truck, a sport utility vehicle, a crossover vehicle, a van, a minivan, a taxi, a bus, etc. The vehicle 47 may include a passenger cabin. The vehicle 47 may include a floor, a roof, an instrument panel, etc.

The airbag 22 is inflatable from an uninflated position (shown in FIG. 1) to an inflated position (shown in FIG. 2). For example, the airbag 22 may be filled with gas to transition from the uninflated position to the inflated position. The airbag 22 may be supported by the seat 38, the floor, the roof, the instrument panel, etc.

The airbag 22 may be formed of a woven polymer or any other material. As one example, the airbag 22 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 22 is a component of an airbag module 48. The airbag module 48 may include a housing 50, an inflator 52, and the airbag 22. The inflator 52 and the airbag 22 may be disposed in the housing 50 in the uninflated position. The housing 50 provides a reaction surface for the airbag 22 in the inflated position. The housing 50 may be supported by the seat 38, the floor, the roof, the instrument panel, etc. The housing 50 may be formed of any material, e.g., a rigid polymer, a metal, a composite, etc.

The tether 34 extends from the carrier 32. The tether 34 is secured to the airbag 22. The tether 34 may be secured to the airbag 22 with stitching, adhesive, etc. The tether 34 may be secured to the carrier 32 with a fastener 66, adhesive, etc. The tether 34 defines a deployment direction DD of the airbag 22. The deployment direction DD is a direction of force applied to the carrier 32 by the tether 34 during inflation of the airbag 22, i.e., an extending direction of the tether 34 between the carrier 32 and a point P where the tether 34 is secured to the airbag 22.

The tether 34 may extend from the first end 28 of the track 26 of the base 24. The tether 34 may be disposed within a channel 54 (described below) of the base 24. The tether 34 may extend through a distal end 56 of the base 24.

The base 24 defines the track 26. For example, the base 24 may include a planar portion 58 and a pair of sidewalls 60. The sidewalls 60 are spaced from each other by a distance D1. The sidewalls 60 extend perpendicular to the planar portion 58. The sidewalls 60 extend parallel to each other. Each of the sidewalls 60 may include a hole 62. The track 26 may be defined by the planar portion 58 and the sidewalls 60. The track 26 may have another design, e.g., a T-slot, a groove, etc.

The track 26 extends from the first end 28 to the second end 30. The first end 28 is spaced from the second end 30. The track 26 may define a longitudinal direction LD. The longitudinal direction LD extends between the first end 28 and the second end 30. The longitudinal direction LD may be parallel to the sidewalls 60.

The base 24 may include a hole 64. The hole 64 may be configured to receive a fastener 66. For example, the fastener 66 may be a bolt, and the hole 62 may be dimensioned to receive a shaft of the bolt. The fastener 66 may secure base 24 to the seat 38 e.g., to the frame 46.

The base 24 may include the distal end 56. The distal end 56 may be spaced from the first end 28.

The base 24 may include an extension receiving portion 68. The extension receiving portion 68 defines a passage 70. The passage 70 may be cylindrical in shape. The passage 70 may extend along the longitudinal direction LD. The passage 70 may be open to the track 26. The passage 70 may extend from the first end 28 towards the distal end 56. The passage 70 may terminate before reaching the distal end 56. For example, the passage 70 may terminate at an abutment surface 72 of the base 24. The abutment surface 72 may be spaced from the distal end 56. The passage 70 may be located at the first end 28. The passage 70 defines a width W1. The width W1 may be a diameter of the cylindrical shape of the passage 70.

Passage 70 may be designed to permit an extension portion 74 (described below) to be slidably received therein. For example, the passage 70 may be larger than the extension portion 74, i.e., the width W1 of the passage 70 may be greater than a diameter D2 of the extension portion 74.

The base 24 may include the channel 54. The channel 54 may be defined by a pair of opposing sidewalls 76. The channel 54 may extend from the distal end 56 to the first end 28. The channel 54 may extend along the passage 70. The channel 54 may be open to the passage 70. The channel 54 may define a width W2. The width W2 may be a distance between the pair of opposing sidewalls 76. The width W2 of the channel 54 may be less than the width W1 of the passage 70. To put it another way, the width W1 of the passage 70 may be greater than the width W2 of the channel 54.

The base 24 may be formed of a rigid polymer, a metal, a composite or any other suitable material.

The carrier 32 may include a main portion 78, the extension portion 74 and a distal end 80.

The main portion 78 may have an elongated rectangle shape. The main portion 78 may define a width W3. The main portion 78 may include a hole 82. The hole 82 may extend between opposing sides of the main portion 78.

The extension portion 74 extends from the main portion 78. The extension portion 74 may be cylindrical in shape. The cylindrical shape of the extension portion 74 defines the diameter D2. The diameter D2 of the extension portion 74 may be less than the width W3 of the main portion 78. The distal end 80 may be on the extension portion 74 opposite the main portion 78. The extension portion 74 may be disposed within the extension receiving portion 68, i.e., within the passage 70.

The carrier 32 may be formed of a rigid polymer, a metal, a composite or any other suitable material. The carrier 32 may be formed of a same type of material as the base 24.

The carrier 32 is releasably fixed to the base 24. For example, a pin 84 may releasably fix the carrier 32 to the base 24. The pin 84 may be received in the holes 62, 82 of the sidewalls 60 and the main portion 78. The pin 84 may be sized to be press fit into one or more of the holes 62, 82. The pin 84 is designed to break when the tether 34 is pulled when the airbag 22 is inflated to the inflated position. For example, a size, a shape, a material, etc., of the pin 84 may be selected to permit the pin 84 to break upon an application of force generated during inflation of the airbag 22 to the inflated position, the force applied to the carrier 32 via the tether 34. The pin 84 may be formed of a rigid polymer, a metal, a composite or any other suitable material. In addition to, or as an alternative, the carrier 32 may be releasably fixed to the base 24 with a tack weld, an adhesive, etc.

The carrier 32 is configured to be slidable along the track 26 when the carrier 32 is released from being fixed to the base 24, e.g., when the pin 84, tack weld, adhesive bond, etc., is broken as a result of inflating the airbag 22. For example, the width W3 of the main portion 78 and the diameter D2 of the extension portion 74 may be less than the distance D1 between the sidewalls 60 defining the track 26. The carrier 32 may be slidable along the track 26 between the first end 28 and the second end 30, e.g., between the sidewalls 60.

Figure 7:
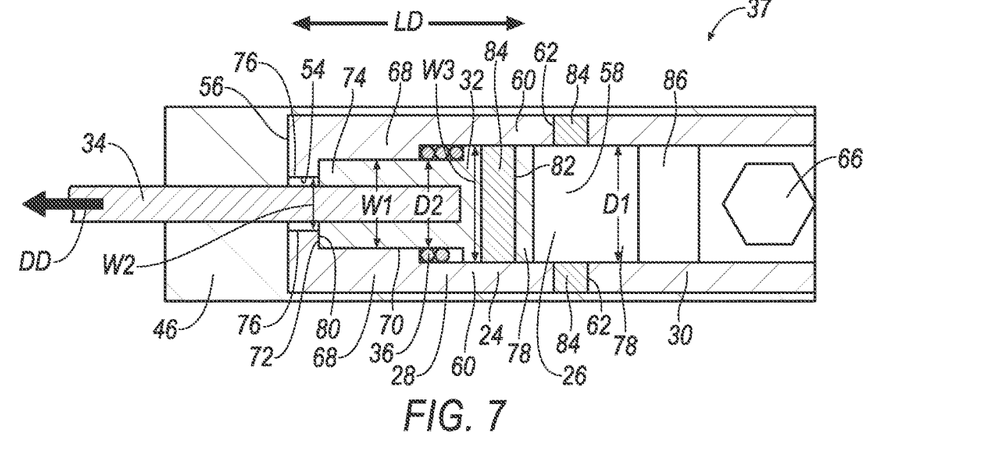
FIG. 7 is a top cross section of the example airbag tether anchoring device with the carrier released from being fixed to the base and in a compressed position.
Figure 8:
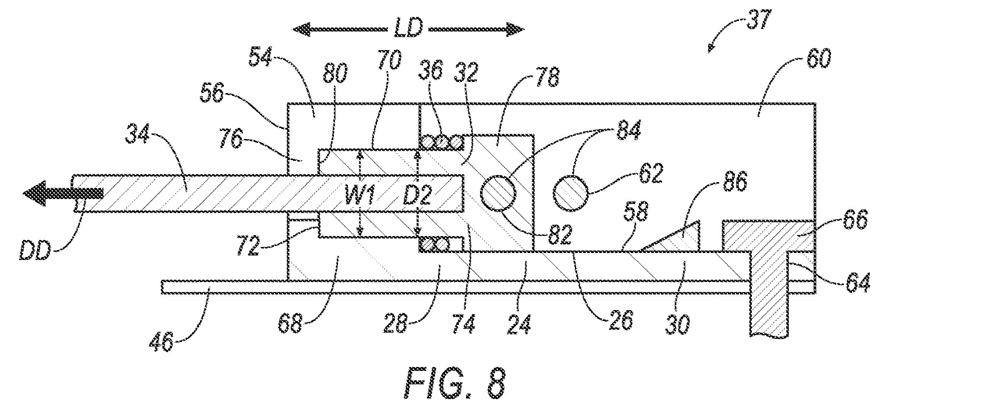
FIG. 8 is a side cross section of the example airbag tether anchoring device of FIG. 7.
Figure 9:
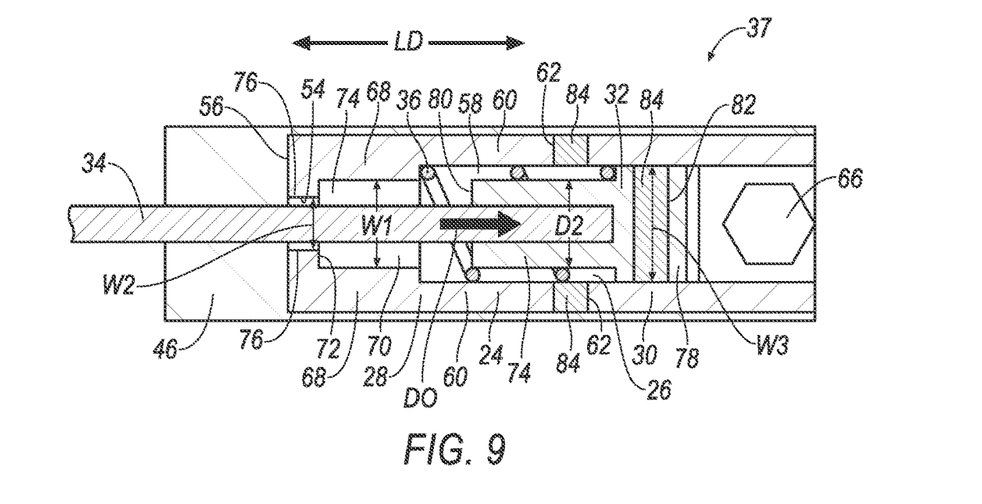
FIG. 9 is a top cross section of the example airbag tether anchoring device with the carrier being ejected from the base.

The carrier 32 may be slidable to a compressed position (shown in FIGS. 7 and 8). In the compressed position the carrier 32 may be at the first end 28. In the compressed position the distal end 80 of the carrier 32 may abut the base 24. For example, the distal end 80 may abut the abutment surface 72. In the compressed position the extension portion 74 may be disposed in the passage 70.

Figure 10:
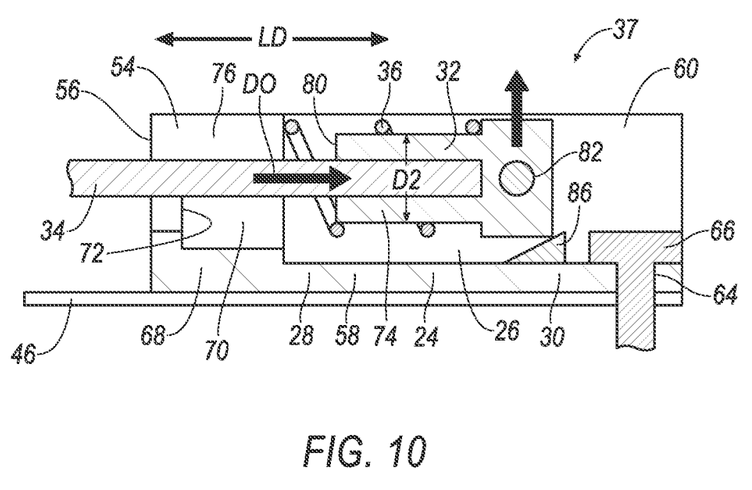
FIG. 10 is a side cross section of the example airbag tether anchoring device of FIG. 9.

The spring 36 may be disposed at the first end 28 and between the carrier 32 and the base 24. For example, the spring 36 may be disposed between the main portion 78 of the carrier 32 and the first end 28. The spring 36 may be disposed outside of the passage 70. The spring 36 may surround the extension portion 74, e.g., the extension portion 74 may be disposed within the spring 36. The spring 36 may be compressed between the base 24 and the carrier 32 when the carrier 32 is in the compressed position. The spring 36 may urge the carrier 32 in a direction opposite DO the deployment direction DD of the airbag 22. The spring 36 may urge the carrier towards the second end 30. The carrier 32 is removable from the base 24 at the second end 30 (shown in FIG. 10).

The airbag system 20, specifically, the tether anchoring device 37, may include a ramp 86. The ramp 86 may be supported by the base 24. The ramp 86 may be disposed at the second end 30. The ramp 86 may be disposed between the sidewalls 60. The ramp 86 may be disposed between the hole 64 of the base 24 and the carrier 32. The carrier 32 may be disposed between the ramp 86 and the spring 36. The ramp 86 provides a reactionary surface to eject the carrier 32 from the base 24. For example, the spring 36 may urge the carrier 32 into abutment with the ramp 86, e.g., subsequent removal of the force applied to the tether 34 during inflation of the airbag 22.

Figure 11:
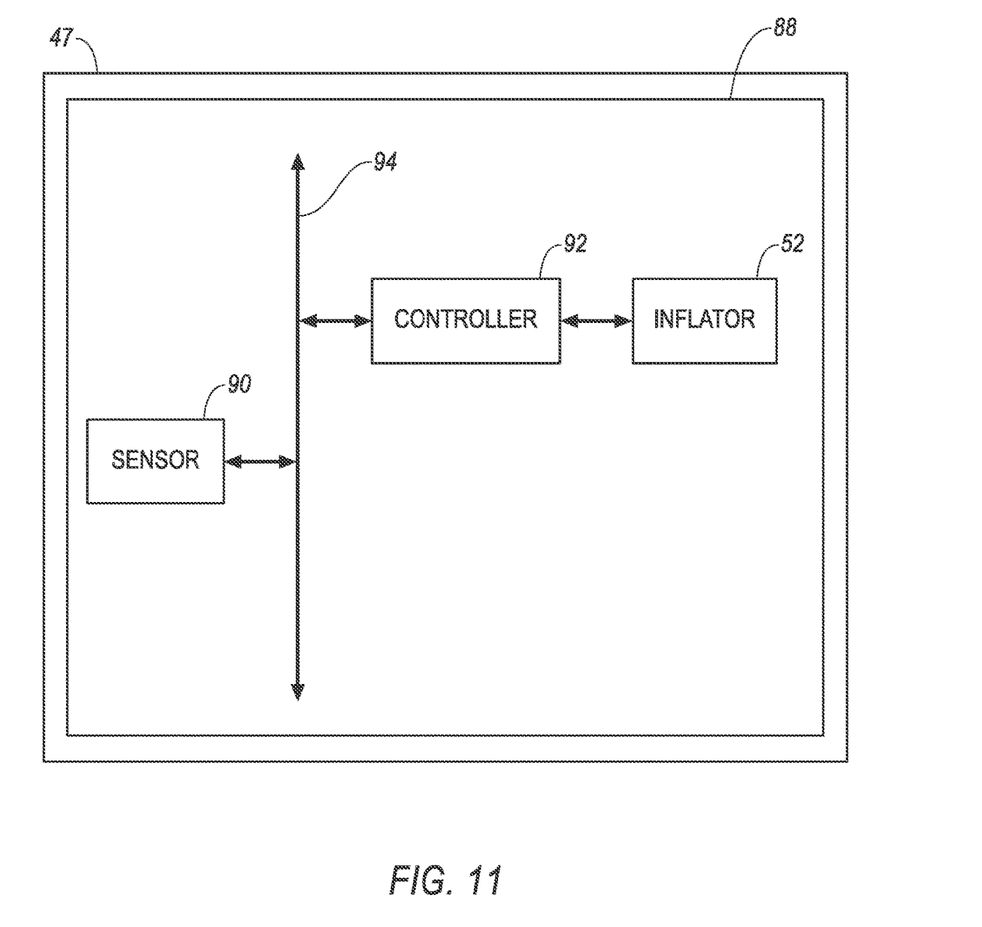
FIG. 11 is a block diagram of an impact sensing system.

With reference to FIG. 11 the vehicle 47 includes an impact sensing system 88. The impact sensing system 88 may include at least one impact sensor 90 for sensing impact of the vehicle 47, and a computer 92 in communication with the impact sensor 90 and the inflator 52. The computer 92 may activate the inflator 52, e.g., provide an impulse to a pyrotechnic charge of the inflator 52, when the impact sensor 90 senses an impact of the vehicle 47. Alternatively or additionally to sensing the impact, the impact sensing system 88 may be configured to sense the impact prior to the impact, i.e., pre-impact sensing.

The impact sensor 90 may be in communication with the computer 92. The impact sensor 90 is configured to detect an impact to the vehicle 47. The impact sensor 90 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 90 may be located at numerous points in or on the vehicle 47.

The computer 92 may be a microprocessor-based computer 92 implemented via circuits, chips, or other electronic components. For example, the computer 92 may include a processor, memory, etc. The memory of the computer 92 may include memory for storing instructions executable by the processor as well as for electronically storing data and/or databases.

Upon receiving a signal, e.g., from the computer 92, the inflator 52 may inflate the airbag 22 with an inflatable fluid medium, such as a gas. The inflator 52 may be, for example, a pyrotechnic inflator 52 that uses a chemical reaction to drive inflation medium to the airbag 22. The inflator 52 may be of any suitable type, for example, a cold-gas inflator 52.

The computer 92 and the impact sensor 90 may be connected to a communication bus 94, such as a controller area network (CAN) bus, of the vehicle 47. The computer 92 may use information from the communication bus 94 to control the activation of the inflator 52. The inflator 52 may be connected to the computer 92, as shown in FIG. 11, or the inflator 52 may be connected directly to the communication bus 94.

In operation, the airbag 22 of the airbag system 20 is in the uninflated position under normal operating conditions of the vehicle 47. In the event of an impact, the impact sensor 90 may detect the impact and transmit a signal through the communication bus to the computer 92. The computer 92 may transmit a signal through the communication bus to the inflator 52. The inflator 52 may discharge and inflate the airbag 22 with the inflation medium from the uninflated position to the inflated position.

Upon inflation, the airbag 22 applies a force to the tether 34. The tether 34 applies such force to the carrier 32. Application of the force on the carrier 32 fractures the pin 84, thereby releasing the carrier 32 from being fixed to the base 24. The carrier 32 slides along the track 26 towards the first end 28 until the distal end of the carrier 32 abuts the abutment surface 72, thereby compressing the spring 36 between the main portion 78 of the carrier 32 and the extension receiving portion 68. In such position, the extension portion 74 is within the passage 70 of the extension receiving portion 68, thereby stabilizing the carrier 32 relative to the base 24 such that the tether 34 may assist in controlling the airbag 22.

When the airbag 22 deflates the force from the tether 34 is removed and the spring 36 urges the carrier 32 to slide along the track 26 toward the second end 30. At the second end 30 the carrier 32 collides with the ramp 86, applying a normal force to the carrier 32 from the ramp 86. The normal force ejects the carrier 32 from the second end 30 of the base 24. The tether 34 is ejected from the base 24 along with carrier 32 via the channel 54.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system, comprising:
   an airbag;
   a base defining a track extending from a first end to a second end;
   a carrier releasably fixed to the base and removable from the base at the second end;
   a tether extending from the carrier and secured to the airbag; and
   a spring disposed at the first end and between the carrier and the base.

2. The airbag system of claim 1, further comprising a seat supporting the airbag and the base.

3. The airbag system of claim 1, further comprising a pin releasably fixing the carrier to the base, the pin being designed to break when the tether is pulled when the airbag is inflated.

4. The airbag system of claim 1, wherein the spring urges the carrier in a direction opposite a deployment direction of the airbag.

5. An airbag tether anchoring device comprising:
   a base defining a track extending from a first end to a second end;
   a carrier releasably fixed to the base and removable from the base at the second end;
   a tether extending from the carrier; and
   a spring disposed at the first end and between the carrier and the base.

6. The airbag tether anchoring device of claim 5, wherein the tether extends from the first end.

7. The airbag tether anchoring device of claim 5, further comprising a ramp supported by the base and disposed at the second end.

8. The airbag tether anchoring device of claim 7, wherein the base includes a hole, and the ramp is disposed between the hole and the carrier.

9. The airbag tether anchoring device of claim 7, wherein the carrier is disposed between the ramp and the spring.

10. The airbag tether anchoring device of claim 5, wherein the carrier includes an extension portion disposed within the spring.

11. The airbag tether anchoring device of claim 5, wherein the carrier includes an extension portion, and the base includes an extension receiving portion that defines a passage designed to permit the extension portion to be slidably received therein.

12. The airbag tether anchoring device of claim 11, wherein the base includes a distal end and a channel extending from the distal end to the first end along the passage, the channel being open to the passage.

13. The airbag tether anchoring device of claim 12, wherein a width of the passage is greater than a width of the channel.

14. The airbag tether anchoring device of claim 11, wherein the extension portion is disposed within the extension receiving portion.

15. The airbag tether anchoring device of claim 5, further comprising a pin releasably fixing the carrier to the base.

16. The airbag tether anchoring device of claim 15, wherein the pin is designed to break when the tether is pulled by an inflating airbag.

17. The airbag tether anchoring device of claim 5, wherein the base includes a distal end and a channel extending from the distal end to the first end, and wherein the tether is disposed within the channel and extends through the distal end.

18. The airbag tether anchoring device of claim 5, wherein the carrier is configured to be slidable along the track to a compressed position when the carrier is released from being fixed to the base, the spring being compressed between the base and the carrier in the compressed position.

19. The airbag tether anchoring device of claim 18, wherein the carrier includes a distal end that abuts the base in the compressed position.

20. The airbag tether anchoring device of claim 18, wherein the carrier includes an extension portion, the base includes an extension receiving portion that defines a passage, and the extension portion is disposed in the passage in the compressed position.

* * * * *